ELECTRICAL SWITCH STRUCTURES

Filed July 2, 1958 3 Sheets-Sheet 1

Inventors;
Abraham P. White,
Henry David Epstein,
by William W. Dalton Jr.,
Att'y.

April 24, 1962 A. P. WHITE ETAL 3,031,551

ELECTRICAL SWITCH STRUCTURES

Filed July 2, 1958 3 Sheets-Sheet 2

Inventors;
Abraham P. White,
Henry David Epstein,
by William W. Holloway,
Att'y.

April 24, 1962 A. P. WHITE ETAL 3,031,551

ELECTRICAL SWITCH STRUCTURES

Filed July 2, 1958 3 Sheets-Sheet 3

Inventors;
Abraham P. White,
Henry David Epstein,
by William W. Dalton, Jr.
Att'y.

3,031,551
Patented Apr. 24, 1962

3,031,551
ELECTRICAL SWITCH STRUCTURES

Abraham P. White, Attleboro, and Henry David Epstein, Boston, Mass., assignors to Texas Instruments Incorporated, Dallas, Tex., a corporation of Delaware Filed July 2, 1958, Ser. No. 746,227
28 Claims. (Cl. 200—122)

This invention relates to electrical switch structures, and more particularly, to such switch structures which are thermally responsive.

An object of this invention is the provision of such switch structures which are capable of exercising control over the temperature of electrical apparatus incorporating more than a single, independently heat-generating, electrical current flow path. A further object is to provide such switch structures which are susceptible of a wide range of combinations of thermal, electrical and mechanical parameters to accommodate various particular installations.

A further object of this invention is to provide such electrical switch structures which are simple, inexpensive, dependable in operation and which incorporate a minimum number of parts.

A further object of this invention is to provide such switch structures which exhibit improved operating characteristics.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated;

Figures 1, 2:
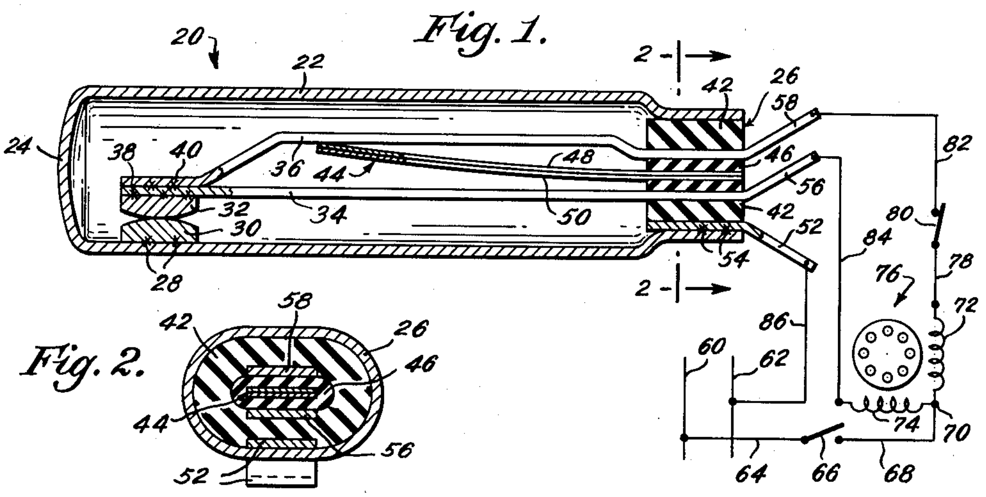
FIG. 1 is a sectional view of an electrical switch with the parts in contacts-closed position according to a first embodiment of the invention, along with a diagrammatically illustrated electrical motor circuit in which the switch is electrically connected.
FIG. 2 is a sectional view of the switch of FIG. 1 taken along line 2—2 in FIG. 1.

Referring to FIG. 1, a thermostatic electrical switch generally indicated by the reference numeral 20 is shown according to a first embodiment of the invention; this switch, along with that of each of the remaining embodiments particularly described herein, being adapted to be mounted in or on an electrical apparatus in good heat-transfer relation with at least one of several parts of the latter which are electrically heated independently of each other. An electrical switch embodying this invention is particularly well-suited for use with electrical motors having several windings. Although the several embodiments of the invention disclosed herein will be particularly described below in association with a motor having a start or auxiliary winding and a main or running winding, it will be apparent that the invention is not limited to such use.

Switch 20 includes a casing 22 formed by a hollow, tubular member having a closed end 24 and an open end 26. Casing 22 is formed of a material having a high coefficient of electrical conductivity and a high coefficient of thermal conductivity. Mounted on casing 22 and electrically connected therewith as by means of a weld at 28 is an electrical contact 30. A movable electrical contact 32 cooperable with contact 30 is carried by a pair of members 34 and 36; contact 32 being welded to a member 34 at 38 and member 34 being welded to member 36 at 40. each of members 34 and 36 is formed of electrically conductive material, and according to this embodiment, each of these members is formed of springy material whereby these members resiliently bias themselves and movable contact 32 toward the contacts-closed position shown in FIG. 1. Each of members 34 and 36 is electrically insulated from the adjacent portions of the casing by means of an annular section 42 of electrically insulating material such as glass fiber.

Switch 20 further includes a thermally responsive member 44 disposed between and electrically insulated from members 34 and 36 by means of an annular section 46 of insulating material such as glass fiber. Thermally responsive member 44, as well as the thermally responsive member of each of the remaining embodiments, may be of the conventional type including at least a first and second layer, 48 and 50, respectively; layer 48, in the embodiment shown in FIG. 1, having a lower coefficient of thermal expansion than that of layer 50 whereby upon heating of the thermally responsive member it flexes in the direction from the position shown in FIG. 1 to the position shown in FIG. 3. It is to be noted that thermally responsive member 44, as well as that of each of the embodiments according to the invention, is electrically isolated against the flow of current therethrough from each of said electrically conductive members. This is so even though the thermally responsive member may be capable of conducting electrical current and may directly engage either of said electrically conductive members since the thermally responsive member is otherwise electrically insulated from the remaining current-carrying parts of the respective electrical circuit.

Figure 3:
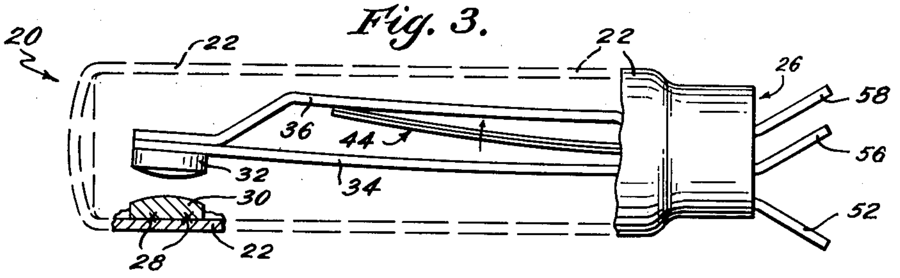
FIG. 3 is a side view of the switch as shown in FIG. 1 and broken away to show the parts in the contacts-open position.

Disposed between and against adjacent portions of casing 22 and electrically insulating section 42 is a terminal-providing member 52 electrically connected to the casing member as by means of a weld at 54. As shown in FIGS. 1 and 3, each of members 34 and 36 includes an extension extending to the exterior of the casing to form a terminal 56 and 58, respectively.

It will be apparent that switch 20 can be assembled by welding contact 30 and terminal 52 to casing 22 to form a first sub-assembly; making another subassembly of members 34, 36 and 44 with electrical insulation sleeve 46 about the latter and electrical insulation sleeve 42 about terminals 56, 58; inserting this sub-assembly into juxtaposition with the casing; and then squeezing down the casing and parts therewithin adjacent the open end 26 of the casing to retain the parts firmly in assembled relationship.

Of the two electrically conductive members 34 and 36, as well as those of each of the remaining embodiments, at least that one electrically connected with the start winding of the associated motor has substantial electrical resistance. As will become apparent as the description proceeds, the electrically conductive member which is electrically connected to the main winding of the associated motor may or may not have significant electrical resistance.

Electrical switch 20 is shown in FIG. 1 as being electrically connected in an electrical motor circuit as is the switch in one of the figures of each of the remaining embodiments. Reference numerals 60 and 62 indicate the two sides of an electrical current source line. Side 60 of the line is electrically connected to a lead 64, through a line switch 66, to a lead 68 which in turn is connected to a common connection 70 between the start or auxiliary winding 72 and the main or running winding 74 of an electrical motor generally indicated by reference numeral 76. The other side of start winding 72 is connected to a lead 78 through an electrical switch 80 to a lead 82 which is electrically connected to terminal 58. Electrical switch 80 may be of any conventional type such, for example, as a centrifugal switch operatively connected with the shaft of motor 76, or it could be an electromagnetic relay responsive to the current flowing in the main winding of the motor. In any case, switch 80 is operable, upon starting of the motor 76 by closing of line switch 66, to effect energization of start winding 72, and is operable, when the motor comes up to speed, to effect de-energization of the start winding. The other side of main winding 74 is connected through a lead 84 to terminal 56. Terminal 52 is electrically connected by means of lead 86 to the other side 62 of the line. It will be apparent that with switches 66 and 80 in closed position and with contacts 30 and 32 in engagement with each other, this ordinarily being the situation upon starting of the motor by closing of switch 66, two independent electrical current flow paths are established. The first of these current flow paths leads from side 60 of the line in succession through start winding 72, electrically conductive member 36, contacts 32 and 30, electrically conductive casing member 22 and terminal 52 to the other side 62 of the line. The second of these electrical current flow paths leads from side 60 of the line in succession through main winding 74, electrically conductive member 34, contacts 32 and 30, electrically conductive casing member 22 and terminal 52 to the other side 62 of the line. It will be noted that opening of contacts 30 and 32 effects electrical de-energization of both the main and the start windings. The electrical circuit is depicted in each case in the quiescent condition before closing of line switch 66 whereby the latter is open, start winding switch 80 is closed (or is closed upon closing of switch 66) and the contacts of the protector switch are closed.

Switch 20 is disposed in good heat-transfer relation with at least the main winding 74 of the motor and, in most cases, in good heat-transfer relation with the start winding 72 also. This can be done, for example, by locating the switch 20 within, against or adjacent the respective windings or against the end bell of the motor.

Operation of the electrical switch 20 along with that of the associated motor circuit is as follows. With electrical switch 20 mounted in good heat-transfer relation with the windings of motor 76 as described above, heat generated in the windings when the latter are electrically energized is conducted through thermally conductive casing 22, and this heat, along with heat generated in member 34 (when of significant magnitude) and heat generated in member 36, is transferred by convection, conduction and radiation to thermally responsive member 44. So long as motor 76 runs with no mechanical load on the shaft of the motor greater than the capacity load for the particular motor (and no other condition exists which would cause abnormal heating of the motor windings or greater than normal current flow through electrically conductive members 34 and 36), that heat generated in the motor windings and generated in each of electrically conductive members 34, 36 which is so transferred to thermally responsive member 44 will be insufficient to cause the thermally responsive member to move with sufficient force against member 36 and against the resilient bias of members 34 and 36 that contact 32 will be moved out of engagement with contact 30.

Two general conditions against which switch 20 protects motor 76 by opening of contacts 30 and 32 are the so-called "locked-rotor" and "running-overload" conditions. Under the locked-rotor condition, the load on the motor is so great as to stop or prevent rotation of the shaft thereof. Under the running-overload condition, the load on the motor is greater than the capacity of the motor but the shaft thereof continues to rotate even though this rotation may be at reduced speed. A particular condition within the general category of running-overload conditions is the so-called "ultimate-trip" condition. The ultimate-trip condition results when an essentially constant load on the motor of a given installation is at the minimum value which will be sufficient to cause the protector switch to trip. All other variables such as ambient temperature, etc. remaining the same, any such constant load at a value less than this minimum will have the effect of causing essentially continuous heating of the main winding resulting in the latter assuming a steady-state constant temperature which will not be sufficiently high that the protector switch will trip, and any such constant load at a value greater than this minimum will have the effect of causing essentially continuous heating of the main winding resulting in the latter increasing in temperature until the protector switch trips. When the load on the motor of the given installation is constant and at said minimum value, heat is continuously generated in the main winding resulting in the latter reaching a steady-state, constant temperature which is only just sufficiently high that eventually the protector switch trips to de-energize the motor. It is while this last-mentioned steady-state temperature ensues that the ultimate-trip condition is experienced. It will be clear that for a given installation the protector switch is so calibrated that it will eventually trip after the main winding has reached the maximum allowable constant temperature. The magnitude of the maximum allowable constant temperature of the main winding determines the magnitude of said minimum value of load on the motor and is determined by the maximum constant temperature of (ordinarily) the main winding at which continuous running of the motor is to be permitted compatible with the minimum intended life of, for example, the insulation covering the turns of the main winding. It will be realized that if switch 80 functions properly, whether it be a centrifugal switch, electromagnetic starting relay or otherwise, the start winding will have become de-energized under ultimate-trip conditions, and consequently, no electrical current will flow through electrically conductive member 36 under this condition. Under the ultimate-trip condition, heat is conducted from the main winding to casing 22 and then transferred to thermally responsive element 44, the latter heats up and, at a predetermined temperature thereof, it will flex against member 36 with sufficient force to move member 36, member 34 and contact 32 to the position of FIG. 3 whereby contacts 30 and 32 are separated from each other so that the main winding as well as the start winding of the motor will be de-energized.

Depending on such factors as the heat-transfer characteristics between the windings and the thermally responsive member of a particular installation, electrically conductive member 34 can be provided of negligible electrical resistance so that no significant heating of member 34 results upon the flow of the main winding current therethrough under the ultimate-trip condition. That is, if, under the ultimate-trip condition, these heat-transfer characteristics and other factors are sympathetic, switch 20 will function simply as a thermostat and significant heating of thermally responsive member 44 will result solely from heat-transfer thereto from the main winding. Alternatively, the electrical resistivity and/or cross-sectional area of electrically conductive member 34 can be so adjusted that the latter will have sufficient electrical resistance so as to result, under the ultimate-trip condition, in the generation of an anticipatory heating of thermally responsive member 44 by transfer from member 34. Thereby, sufficient additional heat to the thermally responsive member will be provided that the latter will eventually cause opening of contacts 30 and 32 after the main winding has reached said maximum allowable constant temperature; this in those cases where the latter temperature would otherwise be exceeded due to factors such as the above-noted heat-transfer characteristics.

Ordinarily, both the main and the start windings will be energized under the locked-rotor condition. In most conventional motors, the rate of heat generation in the start winding 72 due to the current flow therethrough is of much greater magnitude than that in the main winding due to the current flow therethrough, and the result is that the rate of temperature rise of the start winding under this condition is much greater than that of the main winding. In addition to the heat transferred to the thermally responsive member 44 due to that generated in electrically conductive member 34 (if any) and in the windings of the motor under locked-rotor conditions, heat is generated in electrically conductive member 36 due to the flow of the start winding current therethrough (since, as noted above, member 36 has substantial electrical resistance) and a portion of this heat is transferred by radiation, convection and conduction to thermally responsive member 44. This combined heat-transfer causes the thermally responsive member to flex upwardly as viewed in FIG. 1 to cause movement of contact 32 away from contact 30 thereby electrically to de-energize both of the windings of the motor 76. The magnitude of the rate of temperature rise of the windings, and particularly that of the start winding of the motor under locked-rotor conditions is often so great that de-energization of the motor windings must take place in a matter of a very few seconds to prevent damage to the motor. By way of example, the locked-rotor condition encountered by a typical installation may result in a rise in temperature of 30° C. per second in the start winding and 3° C. per second in the main winding. By adjusting such factors as the electrical resistance of member 36, etc., this requirement can be accommodated by switch 20 as well as by the switch of each of the remaining embodiments disclosed herein.

It will be apparent that for a given electrically conductive member 34 the electrical resistance thereof can be of such a value that under the ultimate-trip condition the heating effect of this member on the thermally responsive member will be negligible whereas under the locked-rotor condition this heating effect will be quite substantial, and this is desirable in many cases. By way of example, if the magnitude of the main winding current should increase by a factor of four in going from the ultimate-trip to the locked-rotor condition, the corresponding magnitude of the heating of the electrically conductive member 34 due to the flow of main winding current therethrough would increase by a factor of sixteen.

Other conditions may occur which would result in excessive heating of the motor and against which the latter should be protected. For example, as a result of a mechanical or electrical malfunction, the start winding may not be de-energized at the proper time after starting of the motor. Also, the main winding may fail to become energized upon starting of the motor. Furthermore, it is possible that the locked-rotor condition will be encountered at the same time that, due to the failure, for example, of the starting switch, the start winding of the motor fails to be energized.

Ordinarily and as noted above, the rate of temperature rise of the start winding is substantially greater than that of the main winding, and this is the case even in situations where the magnitude of the electrical current flow through both the main and start windings is approximately equal under the locked-rotor condition. It will be apparent, therefore, that unless the protector switch provides for independent heating effect on the thermally responsive means by the respective electrical current flow in each of the two windings (and this even though the heating effect of one of said electrically conductive members is nil under one or more of the above-noted abnormal conditions), the different abnormal conditions and the degree of these conditions against which the motor is to be protected will be disadvantageously limited. That is, for example, a protective switch unlike that of this invention which does not effect the de-energization of both windings by independent sensing of the respective currents through the two windings would over-protect the motor against the conditions of locked-rotor with both windings energized if it adequately protected against the conditions of locked-rotor with only the start winding energized, and, conversely, would under-protect the motor against the condition of locked-rotor with only the start winding energized if it adequately protected against the condition of locked-rotor with both windings energized. However, adequate protection of a given motor against the conditions of locked-rotor with both windings energized and of locked-rotor with only the start winding energized as well as against the remaining abnormal conditions mentioned above and others without undue over-protection or under-protection of any one of them is reliably provided by suitable adjustment of the parameters of a protector switch according to the invention.

Figures 4, 5:
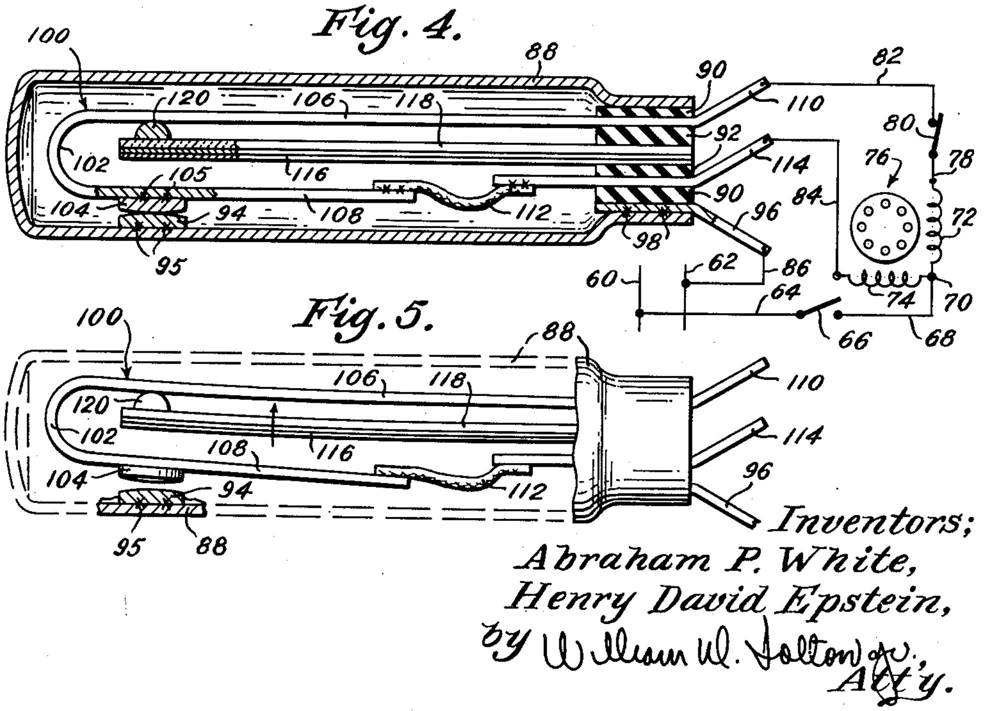
FIG. 4 is a sectional view of an electrical switch with the parts in contacts-closed position according to a second embodiment of the invention, along with a diagrammatically illustrated motor circuit in which the switch is electrically connected.
FIG. 5 is a side view of the switch of FIG. 4 and broken away to show the position of the parts in contacts-open position.

Referring to FIGS. 4 and 5, a second embodiment of the invention is shown incorporating several modifications any number of which can be incorporated in the embodiment shown in FIGS. 1–3. According to the embodiment of FIGS. 4 and 5, casing member 88, electrically insulating sections 90 and 92, stationary contact 94, the weld 95 between contact 94 and casing member 88, terminal 96, and the weld 98 between terminal 96 and casing 88 are or may be identical with their respective counterparts in the embodiment of FIGS. 1–3. According to the embodiment of FIGS. 4 and 5, however, the electrically conductive members corresponding to electrically conductive members 34 and 36 of the previously described embodiment are provided by a single, unitary, integral element 100 formed with a return-bent portion 102. Movable contact 104 is welded at 105 to element 100 thereby to divide unitary element 100 into individual electrically conductive members 106 and 108, respectively. Electrically conductive member 106 extends from outside the casing with terminal portion 110, into the interior of the casing, along return-bent portion 102 to the junction of contact 104 with element 100. Electrically conductive member 108 extends from the junction of movable contact 104 with element 100 to a flexible lead 112. Flexible lead 112 is welded or otherwise electrically connected at each of its ends to the respective ends of member 108 and a terminal-providing member 114, the latter extending from within to the exterior of the casing. It will be noted that electrically conductive member 108 could be made in the form of an integral piece extending out to and including terminal 114 as with electrically conductive member 34 of the embodiment of FIGS. 1–3, in which case flexible lead 112 would be eliminated. The construction as shown in FIGS. 4 and 5 which includes flexible lead 112, however, provides the advantage of reducing the rigidity of the combined structure of electrically conductive members 106 and 108, thereby permitting the use of a thermally responsive member capable only of exerting a lesser amount of force to effect opening of contacts 104 and 94 as compared, for example, with the amount of force required to be exerted by thermally responsive member 44 of the embodiment of FIGS. 1–3. It will be obvious that although the electrical resistivity of the material of both electrically conductive members 106 and 108 is the same (because they are formed of a single, integral strip of material) the electrical resistance and consequent heating effect of these two members may be varied with respect to each other, for example, by adjusting the respective widths of these members. The thermally responsive element 116 may be identical or similar to that of the previously described embodiment except that it has a layer of thermally insulating material 118 such as mica disposed thereon and between electrically conductive member 106 and the thermally responsive member 116. With thermally insulating member 118 so disposed, the rate of heat transfer between electrically conductive member 106 and the thermally responsive member 116 is decreased without substantially affecting the rate of heat transfer between electrically conductive member 108 and the thermally responsive element. It will be apparent, that where such a decrease in the rate of heat transfer between members 106 and 116 is not desired or required, insulating member 118 may be eliminated from the embodiment as shown in FIGS. 4 and 5. In addition, thermally responsive element 116 carries a projection 120 in engagement with member 106, although it will be apparent that the provision or lack thereof of member 120 involves, in this embodiment, only a matter of design. Because thermally responsive member 116 is electrically isolated, as described above with respect to the embodiment of FIGS. 1–3, projection 120, when provided, can be formed of either electrically conductive or electrically insulating material.

It will be apparent that the switch according to the embodiment of FIGS. 4 and 5, as well as those according to the remaining embodiments to be described, will operate in a manner substantially similar to that of the first-described embodiment, except, of course, that thermally responsive member 116 will be required to exert less force to cause opening of contacts 104 and 94 other things being equal, and the rate of heat transfer from electrically conductive member 106 to the thermally responsive member 116 will be substantially slower when the insulating strip 118 is disposed therebetween.

The switch of this second embodiment could be assembled in the same manner as that described above with respect to the embodiment of FIGS. 1–3.

Figures 6, 7, 8, 9, 10:
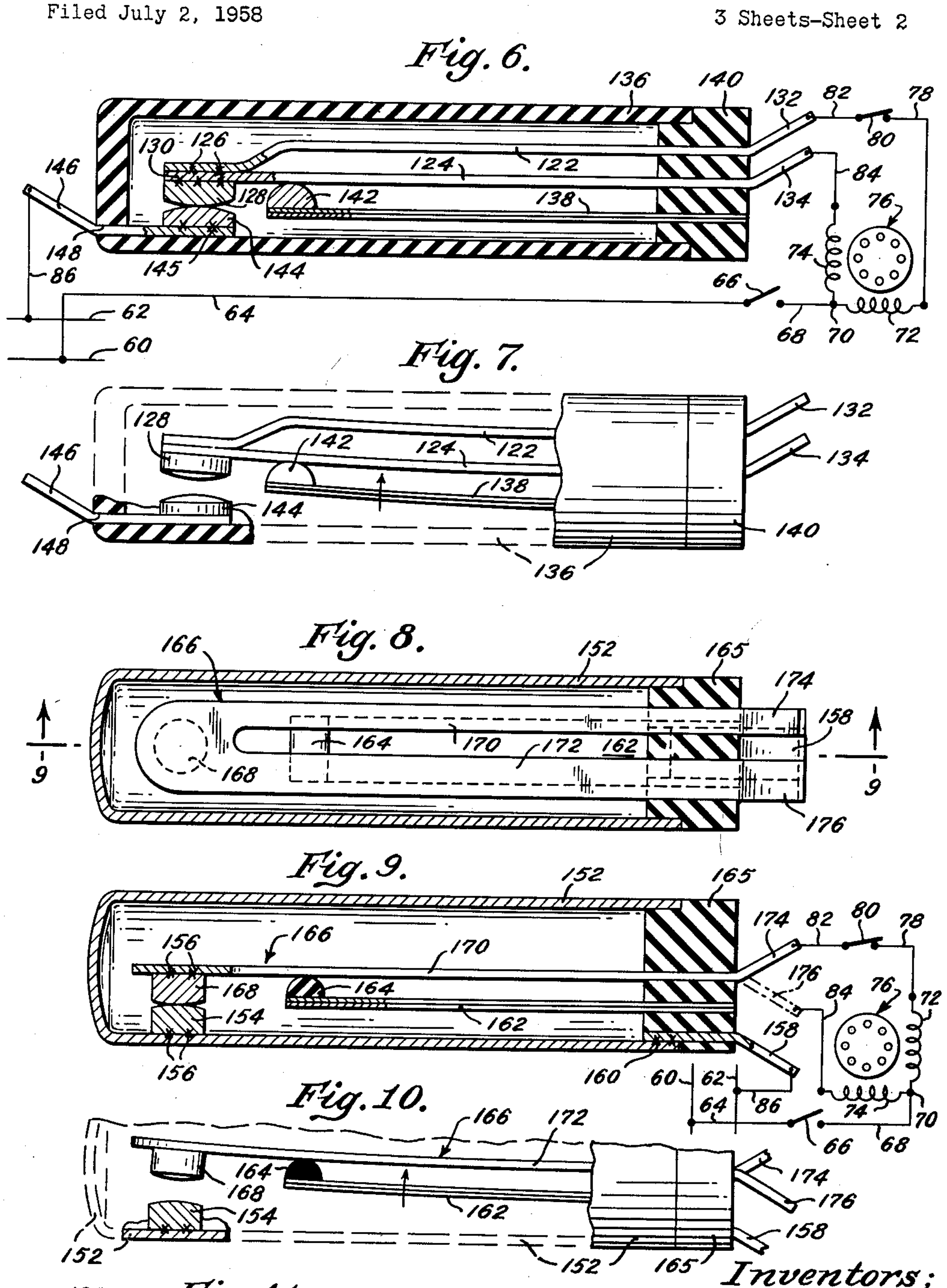
FIG. 6 is a sectional view of an electrical switch with the parts in contacts-closed position according to a third embodiment of the invention, along with a diagrammatically illustrated motor circuit in which the switch is electrically connected.
FIG. 7 is a side view of the switch of FIG. 6 broken away to show the position of the parts in contacts-open position.
FIG. 8 is a sectional plan view of an electrical switch with the parts in contacts-closed position according to a fourth embodiment of this invention.
FIG. 9 is a sectional view taken along line 9—9 in FIG. 8, along with a diagrammatically illustrated motor circuit in which the switch is electrically connected.
FIG. 10 is a fragmentary side view of a portion of the switch as shown in FIG. 9 and broken away to show the parts in contacts-open position.

A third embodiment of the invention is illustrated in FIGS. 6 and 7 wherein electrically conductive members 122 and 124, the weld 126 therebetween, movable contact 128, the weld 130 between contact 128 and member 124, and terminals 132 and 134 are or may be identical with their counterparts in the embodiment of FIGS. 1–3. According to this embodiment, however, hollow casing member 136 is formed of an electrically insulating but thermally conductive material, and thermally responsive member 138 and electrically conductive members 122 and 124 are insulated from each other by means of a single section of insulating material 140 which can be molded about members 122, 124 and 138 in situ before being assembled and bonded within and to casing 136 as shown. In addition, the embodiment of FIGS. 6 and 7 illustrates a second way of providing means disposed between electrically conductive member 122 and thermally responsive element 138 to decrease the rate of heat transfer between these members. This means, in the embodiment of FIGS. 6 and 7, is the electrically conductive member 124 disposed between member 122 and the thermally responsive element 138. A projection 142 is mounted on and carried by thermally responsive member 138 in the manner structurally and functionally identical with that of projection 120 in the embodiment of FIGS. 4 and 5. As with the embodiment shown in FIGS. 4 and 5, projection 142 may be eliminated if desired. The fixed contact 144 is cooperable with movable contact 128 and is electrically connected as by a weld 145 to a terminal 146 which in turn is mounted on casing 136 and extends through an aperture 148 in the latter to the exterior of the casing. One of the advantages of this embodiment is that casing 136, being formed of electrically insulating material, the insulation surrounding the individual turns of the windings of the motor 76 and any other additional insulating means need not be relied upon to insulate the casing electrically from the windings.

Referring to the embodiment shown in FIGS. 8–10, casing member 152, stationary contact 154, weld 156 between contact 154 and casing 152, terminal 158, and the weld 160 between the latter and casing 152 are or may be identical with their respective counterparts in both of the embodiments shown in FIGS. 1–3 and FIGS. 4 and 5, respectively; thermally responsive member 162 and button or projection 164 carried thereby are or may be identical with their respective counterparts in the embodiment of FIGS. 6 and 7; and section 165 of insulating material may be molded about the parts carried thereby and subsequently bonded within and to casing 152 as described with respect to the embodiment of FIGS. 6 and 7. This embodiment shows a second form whereby both of the electrically conductive members are provided by a single unitary strip of material. As with the embodiment of FIGS. 4 and 5, a single unitary element 166 has welded or otherwise electrically connected thereto a movable contact 168 for cooperation with stationary contact 154. Element 166 is U-shaped in form and each of the electrically conductive members 170 and 172, respectively, extends from a respective terminal portion 174, 176 from outside the casing, into the interior of the casing to the junction of each of the respective electrically conductive members with movable contact 168. A convenient way to adjust the electrical resistance of electrically conductive members 170 and 172 is to vary the width of these members, and this is suggested in FIGS. 8–10 wherein electrically conductive member 172 is shown as being substantially wider than electrically conductive member 170. Conveniently, of course, electrically conductive members 170 and 172, being formed of a single, unitary, flat strip of electrically conductive material, would both have the same thickness. When projection 164 engages members 170 and 172 at the location as shown in FIGS. 8–10, it is preferable that this projection be formed of electrically insulating material to prevent the possibility that a portion of the start winding current will bypass that part, for example, of electrically conductive member 170 which extends between movable contact 168 and the location where projection 164 engages member 170. Otherwise said portion of the start winding current would flow along projection 164 to member 172 and along the latter to movable contact 168 providing, of course, that the electrical resistivity of member 172 is lower than that of member 170. When projection 164 engages member 166 at or adjacent the end of the slot in the latter between members 170 and 172 however, this projection can be formed of electrically conductive as well as electrically insulating material as with previously described embodiments. Electrically insulating section 165 can be molded about the adjacent portions of element 166 (or element 180 to be described below) and member 162 in situ and then bonded to and within casing member 152 as described above with respect to the embodiment of FIGS. 6 and 7.

Figure 11:
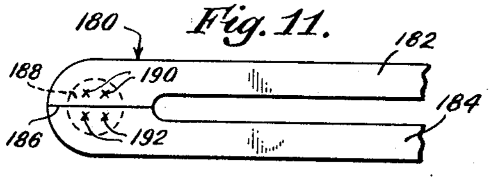
FIG. 11 is a plan view broken away in part of an electrically conductive element according to a fifth embodiment of the invention, which element can be substituted for that of the embodiment of FIGS. 8–10 as well as that of each of the other disclosed embodiments.

FIG. 11 illustrates a modification of the element 166 as described above with respect to the embodiment of FIGS. 8–10. In this regard, element 180 is or may be identical with element 166 except as pointed out following. Element 180 is formed from two separate electrically conductive members 182 and 184, respectively, each of the latter being formed of a material having a different electrical resistivity and/or different width, thickness, etc. than the other to accommodate the characteristics desired according to the particular installation. Electrically conductive members 182 and 184 meet along a junction line 186, along which junction line members 182 and 184 may be butt-welded together, or, alternatively and as shown in FIG. 11, members 182 and 184 may be electrically and mechanically connected to movable contact 188 by means of welds 190 and 192 between movable contact 188 and each of electrically conductive members 182 and 184. It will be noted that the respective widths of each of members 182 and 184 need not be different from or the same as the other in a given case due to the considerations affecting the widths of members 170 and 172 in the embodiment of FIGS. 8–10 since the electrical resistance of members 182 and 184 could be determined, for example, by proper selection of the respective materials of which these respective members are formed.

Both of the electrically conductive members (which carry the main winding and start winding currents, respectively) of each of the embodiments as previously described are formed of springy material for resiliently biasing the respective movable contact toward contacts-closed position. In some cases, however, the temperature to which at least the electrically conductive member which carries the start winding current must be heated may be so high that annealing of the latter member would occur with a resultant decrease in spring properties and upsetting of the calibration of the switch. This can be avoided with each of the above-described embodiments by the provision of a separate spring member to provide the necessary resilient bias tending to maintain the respective movable contact in engagement with the respective mating contact. The manner by which this can be accomplished in each of the preceding embodiments will be apparent from the following description of the embodiment shown in FIGS. 12–14.

Figures 12, 13:
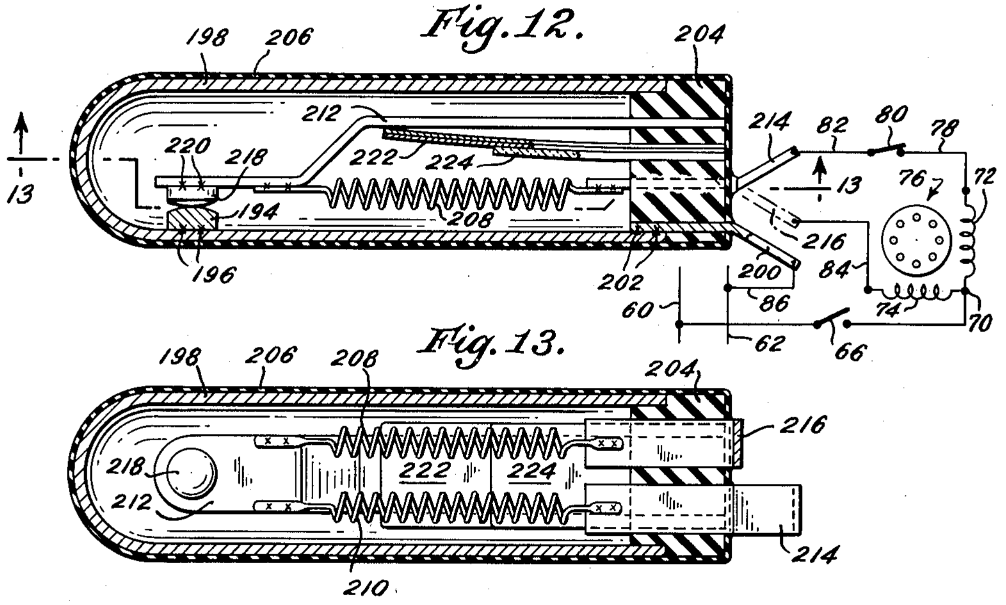
FIG. 12 is a sectional plan view of an electrical switch with the parts in contacts-closed position according to a sixth embodiment of the invention, along with a diagrammatically illustrated motor circuit in which the switch is electrically connected.
FIG. 13 is a sectional view taken along line 13—13 in FIG. 12.
Figure 14:
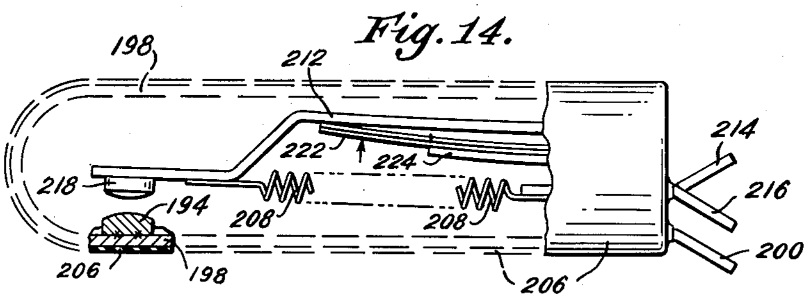
FIG. 14 is a side view of the switch shown in FIGS. 12 and 13 broken away to show the parts in contacts-open position.

Referring to FIGS. 12–14, a fixed contact 194 welded at 196 to casing member 198, a terminal 200 welded at 202 to casing 198, and a section of electrically insulating material molded in situ about the members which it carries and bonded to casing 198 are provided, all of which are or may be identical with their respective counterparts in the embodiment of FIGS. 8–10 except that, in the case of the embodiment of FIGS. 12–14, casing 198 has a layer 206 of electrically insulating but thermally conductive material covering the exterior thereof. Layer 206 can be applied in any conventional manner such as by dipping or spraying. In this way, the advantages of a casing which is electrically conductive but which in and of itself is electrically insulated from the windings of the motor are provided.

The electrically conductive members 208, 210 of the embodiment of FIGS. 12–14 are provided in the form of wire coils, each of which is electrically connected at one end as by welding to a resilient spring member 212. The opposite end of electrically conductive member 208 is welded or otherwise electrically connected to terminal 214 and the other end of electrically conductive member 210 is electrically connected in similar manner to terminal 216. A moveable contact 218 welded or otherwise secured at 220 to member 212 is cooperable with stationary contact 194. At least electrically conductive member 210 (which is electrically connected to start winding 72), and oftentimes electrically conductive member 208 (which carries the electrical current through main winding 74) as well, has substantial electrical resistance for heating thermally responsive member 222. Members 208 and 210 may be relatively flimsy or otherwise incapable of inherently exerting a resilient force biasing movable contact 218 toward engagement with contact 194. In any case, member 212 is formed of springy material and resiliently biases contact 218 toward contacts-closed position.

Thermally responsive member 222 is shown in FIGS. 12–14 as being provided with a layer 224 of thermally insulating material such, for example, as mica, as with layer 118 in the embodiment of FIGS. 4 and 5; but layer 224 extends along only a portion of thermally responsive member 222 to illustrate the feature that such a layer, whenever provided for any of the disclosed embodiments, may extend along less then the entire length of the respective thermally responsive member and thereby provide for a correspondingly less effective depressant toward heat transfer to the thermally responsive member.

It will be apparent that electrically conductive members 208 and 210 can take any number of a variety of different conformations. Also, if electrically conductive member 210 for a particular installation is not to have sufficient electrical resistance to cause significant heating of the thermally responsive member even under the locked-rotor condition, a simple flexible lead or "pigtail" of insignificant electrical resistance could be substituted therefor.

After assembling and bonding insulating section 204 with and to the remaining parts, the switch of the embodiment of FIGS. 12–14 may be provided with electrical insulating coating 206 by spraying, dipping, etc. as described above.

An advantage of the feature that the thermally responsive member of each of the embodiments according to the invention is electrically isolated against the flow of electrical current therethrough from each of the said respective electrically conductive members is that, necessarily thereby, the temperature of the thermally responsive member under any of the abnormal conditions described above lags behind the temperature of at least one of said electrically conductive members and/or a part of the electrical device being protected. This is advantageous in that the thermally responsive member will tend to continue to heat for a time interval after separation of the contacts of the protective switch. As a consequence, reclosing of these contacts is delayed and the characteristic of positive contact opening, as distinguished from prompt reclosing after opening and continued frequent cycling of the contacts between open and closed position, is improved. Another advantage is that, thereby, mounting of one or more electrical contacts on the thermally responsive member and attendant problems can be avoided.

Delay between opening and closing of the contacts of the protective switch is also effected with each of the embodiments according to the invention by providing the thermally responsive member with an operating temperature differential whereby the thermally responsive member will effect opening of the contacts of the respective switch of the invention at a temperature of the thermally responsive member substantially greater than that at which the latter will effect closing of these contacts. As will be apparent to those with only ordinary skill in the art, this could be accomplished by virtue of the frictional effect between the respective said electrically conductive member and the thermally responsive member (or projection carried by the latter) in engagement therewith. Alternatively, the thermally responsive member, instead of being creep-acting as depicted in each of the embodiments disclosed above, could be provided as a snap-acting member of the type shown in U.S. Patent No. 1,448,240.

By way of example, the said electrically conductive members of each of the embodiments according to the invention can be formed of the following materials: electrical heater material such as Inconel or Nichrome where the particular electrically conductive member is to have significant electrical resistance so as to have a heating effect on the thermally responsive member and copper or brass where the particular electrically conductive member is to have insignificant electrical resistance so as to have a negligible heating effect on the thermally responsive member. Inconel is a registered trademark for a high nickel-chromium iron alloy containing approximately 79.5% nickel, 13.0% chromium, 6.5% iron, 0.25% manganese, 0.25% silicon, 0.08% carbon and 0.20% copper. Nichrome is a registered trademark for an alloy containing 15–16% chromium, 59–62% nickel, about 24% iron and 0.1% carbon. Where a springy material is required which is not intended to carry electrical current, such, for example, as that of which spring member 212 of the embodiment of FIGS. 12–14 is formed, beryllium-copper, Phosphor-bronze or spring steel can be used. It will be obvious that many different materials could be substituted for those named above to provide the electrical, thermal and mechanical characteristics desired in the particular switch.

That portion of the casing of each of the embodiments according to the invention which is to be electrically conductive may be formed, for example, of copper or brass. Those portions of the casing which are to be electrically insulating may be formed of any one of a number of conventional, moldable plastics suitable for this purpose.

In view of the above, it will be seen that the several objects of the invention are achieved and other advantageous results attained.

Dimensions of certain of the parts as shown in the drawing have been modified for the purposes of clarity of illustration.

As many changes could be made in the above constructions without departing from the scope of the invention, it is intended that all matter contained in the above description or shown in the accompanying drawings, shall be interpreted as illustrative and not in a limiting sense.

We claim:

1. In combination: a tubular casing; a pair of electrical contacts within said casing, one of which is movable into and out of engagement with the other of said contacts; a plurality of electrically conductive members electrically connected with said movable contact and arranged for movement therewith, at least two of said electrically conductive members comprising electrical heater members having substantial electrical resistances; said electrically conductive members and said movable contact being spring biased for movement in a direction for mutual engagement of said contacts; a creep-type thermally responsive device disposed within said casing for engagement with at least one of said electrically conductive members to move the latter and said movable contact in a contacts-opening direction when said thermally responsive device reaches a predetermined temperature, said thermally responsive device being mounted and disposed in heat-transfer relation with said electrically conductive members; and one of said electrical heater members having means adapted for electrical connection with one winding of an electric motor and the other of said electrical heater members having means adapted for electrical connection with another winding of said motor.

2. In combination: a pair of electrical contacts one of which is movable into and out of engagement with the other of said contacts; a thermally responsive member operatively connected to open said contacts upon heating thereof to a predetermined temperature; a pair of electrically conductive members electrically connected to and movable with said movable contact; one of said electrically conductive members having means adapted for electrical connection with one winding of an electrical motor and the other electrically conductive member having means adapted for electrical connection with another winding of said motor; and said electrically conductive members comprising electrical heating members having substantial electrical resistances and disposed in heat-transfer relation to said thermally responsive member.

3. In combination: a casing; a pair of electrical contacts within said casing, one of which is movable into and out of engagement with the other of said contacts; means supporting said movable contact for movement relative to said other of said contacts; said means including a pair of electrically conductive members electrically connected with said movable contact; said electrically conductive members comprising electrical heater members having substantial electrical resistances; said electrically conductive members and said movable contact being spring biased for movement with respect to said other contact; a thermally responsive device disposed within said casing and positioned for engagement with said supporting means to move said electrically conductive members and said movable contact against their spring bias to actuate said contacts when said thermally responsive device reaches a predetermined temperature; said thermally responsive device being disposed in intimate heat-transfer relation with said electrical heater members and each of said electrical heater members having means adapted for electrical connection to an electrically conductive member.

4. The combination as set forth in claim 3 and wherein said pair of electrically conductive members are integrally formed and comprises a unitary element.

5. The combination as set forth in claim 4 and wherein said movable contact is carried by said unitary element for movement therewith out of engagement with said stationary contact in response to movement of said thermally responsive member upon heating thereof to said predetermined temperature.

6. The combination as set forth in claim 3 and wherein said pair of electrically conductive members comprises individual members separately formed, and each electrically connected to said movable contact.

7. The combination as set forth in claim 3 and including means disposed intermediate said electrical heater members and at least a portion of said thermally responsive device to decrease the rate of heat transfer between said electrical heater members and said thermally responsive device.

8. In combination: a hollow casing; first, second and third electrical terminals each including portions thereof exposed externally of said casing for connection thereof to electrical leads; a first electrical contact and a second electrical contact disposed within said casing, said first electrical contact being electrically connected to said first terminal; resilient means biasing said second electrical contact toward engagement with said first contact; first and second electrically conductive members positioned within said casing, each of said electrically conductive members comprising heater members having substantial electrical resistances; each of said electrical heater members being electrically connected to said second contact and arranged for movement therewith under the bias of said resilient means; said first and second electrically conductive members being respectively connected to said second and third terminals; a thermally responsive device mounted in said casing in electrically isolated relation against the flow of electrical current therethrough and disposed in heat-transfer relation with respect to said electrical heater members; said thermally responsive device being positioned for moving said heater members and said second contact in a direction for disengagement with said first contact against the bias of said resilient means upon heating of said thermally responsive device to a predetermined temperature.

9. The combination as set forth in claim 8 and wherein said pair of electrically conductive members are integrally formed and comprises a unitary element.

10. The combination as set forth in claim 8 and wherein said movable contact is electrically connected to and carried by said unitary element for movement therewith, said thermally responsive device being engageable with at least one of said electrically conductive members to move the latter and said movable contact carried thereby out of engagement with said first contact in response to movement of said thermally responsive device upon heating thereof to said predetermined temperature.

11. The combination as set forth in claim 8 and wherein said first and second electrically conductive members comprise individual members separately formed, and said first and second electrically conductive members supporting said second contact for movement into and out of engagement with said first contact.

12. The combination as set forth in claim 8 and including means disposed intermediate at least a portion of said thermally responsive device and said electrically conductive heater members to decrease the rate of heat transfer therebetween.

13. The combination as set forth in claim 8 wherein said casing is formed of electrically and thermally conductive material, said first contact is mounted on said casing in electrical connection therewith, and said first terminal is electrically connected to said casing.

14. The combination as set forth in claim 13 including a layer of electrically insulating material covering the external surface of said casing.

15. The combination as set forth in claim 8 wherein said casing is formed of electrically insulating, thermally conductive material, and said first contact is mounted on said first terminal.

16. The combination as set forth in claim 8 and wherein said thermally responsive device comprises a creep-type elongated composite thermally responsive member cantilever mounted adjacent one end thereof in said casing.

17. In combination: a tubular casing; a pair of electrical contacts within said casing, one of which is movable into and out of engagement with the other of said contacts; a pair of electrically conductive members electrically connected to and supporting said movable contact, said electrically conductive members comprising electrical heater members having substantial electrical resistances; said electrically conductive members and said movable contact being spring biased in a direction for mutual engagement of said contacts; a creep-type thermally responsive device disposed within said casing for engagement with at least one of said electrically conductive members to move the latter and said movable contact in a contacts-opening direction when said thermally responsive device reaches a predetermined temperature, said thermally responsive device being mounted in electrically isolated relation against the flow of electrical current therethrough and disposed in heat-transfer relation with said electrically conductive members.

18. The combination as set forth in claim 17 and wherein said electrically conductive members are formed of spring material which resiliently urge the movable contact in a direction for engagement with the other of said contacts.

19. The combination as set forth in claim 17 which includes a spring member connected to said electrically conductive members urging said movable contact into engagement with the other of said contacts.

20. The combination as set forth in claim 17 and wherein said creep-acting thermally responsive device comprises a cantilever mounted, elongated bimetallic strip.

21. The combination as set forth in claim 17 and wherein said tubular casing is formed of electrically insulating, thermally conductive material.

22. The combination as set forth in claim 17 and wherein said electrically conductive members comprise a unitary flat strip and said electrically conductive members being formed of different widths thereby providing different electrical resistance for each of said members.

23. The combination as set forth in claim 22 and wherein said electrically conducting members are coplanar.

24. The combination as set forth in claim 17 and wherein each of said electrically conductive members are formed of heater material comprising individual members separately formed and each electrically connected to said movable contact.

25. The combination as set forth in claim 17 and wherein said thermally responsive device is disposed intermediate said pair of electrically conductive members and is adapted to engage at least one of them.

26. The combination as set forth in claim 17 and wherein the resistance of one of said pair of electrically conductive members is different from that of the other.

27. In combination: a tubular casing; a pair of electric contacts within said casing, one of which is movable into and out of engagement with the other of said contacts; a spring member mounted in electrically isolated relation against the flow of electrical current therethrough supporting said one movable contact for movement relative to said other contact and resiliently urging said movable contact for movement in a direction for engagement with the other of said contacts; a pair of electrically conductive members comprising electrical heater members having substantial electrical resistances, each of said pair of electrical heater members being electrically connected to said movable contact, each of said electrical heater members being individually electrically connectable with a respective different winding of an electric motor; a creep-type thermally responsive composite element disposed within said casing and mounted in electrically isolated relation against the flow of electrical current therethrough, said thermally responsive composite element being mounted in heat-transfer relation to said heater members and positioned to engage said spring member to move the latter and said movable contact in a contacts-opening direction when said thermally responsive composite element reaches a predetermined temperature.

28. The combination as set forth in claim 3 and wherein said thermally responsive device is mounted in electrically isolated relation against the flow of electrical current therethrough.

References Cited in the file of this patent

UNITED STATES PATENTS

| | | |
|---|---|---|
| 1,401,049 | Conklin | Dec. 20, 1921 |
| 1,871,875 | Bradford | Aug. 16, 1932 |
| 2,189,996 | Riche | Feb. 13, 1940 |
| 2,199,638 | Lee | May 7, 1940 |
| 2,421,538 | Clark | June 3, 1947 |
| 2,768,342 | Vaughan et al. | Oct. 23, 1956 |
| 2,820,870 | Moksu | Jan. 21, 1958 |
| 2,824,941 | Fry | Feb. 25, 1958 |
| 2,879,355 | Welsh | Mar. 24, 1959 |